Figure 1:
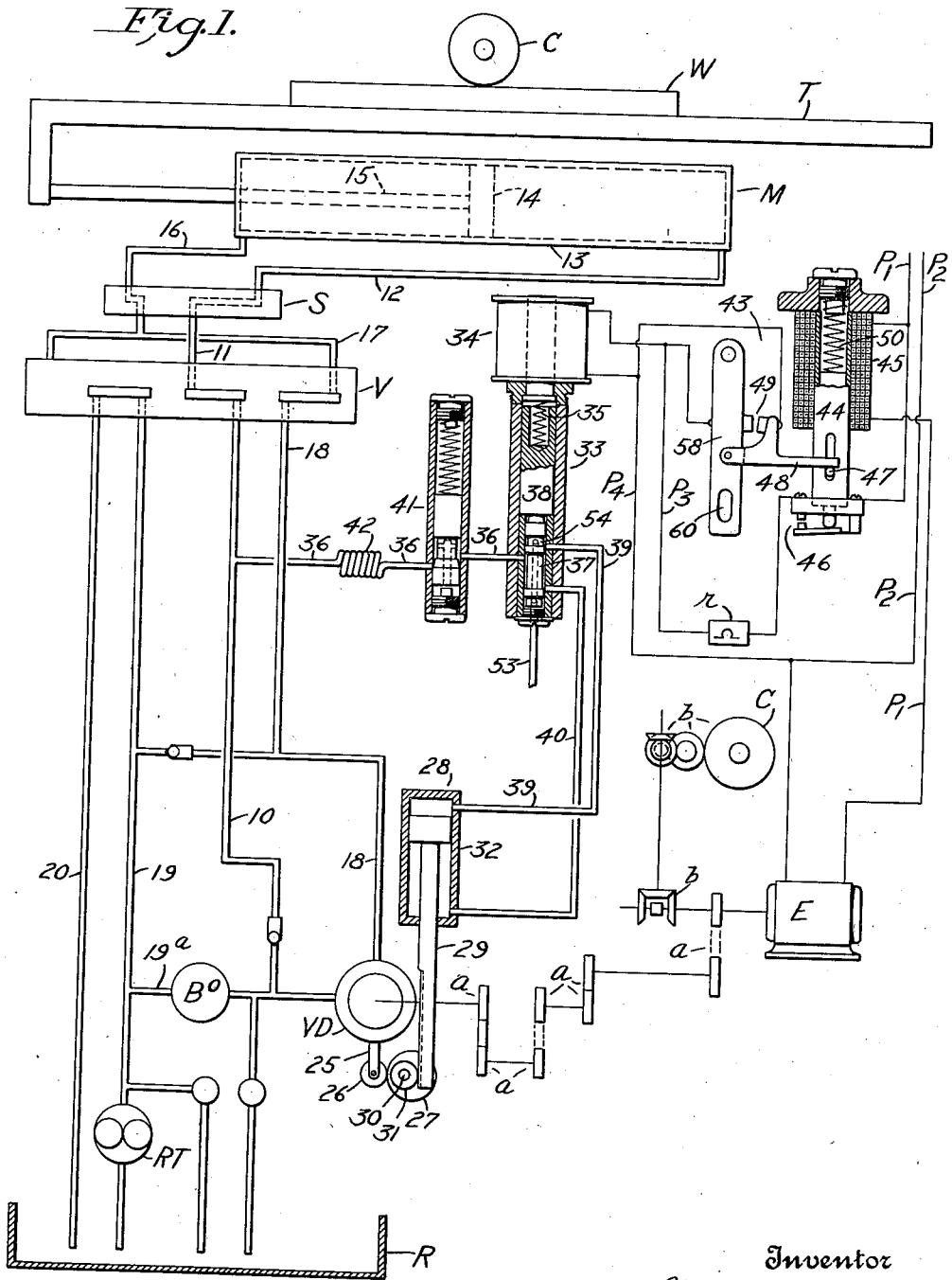

April 2, 1935.  H. ERNST  1,996,467
ELECTROMAGNETIC HYDRAULIC FEED CONTROL
Filed Oct. 7, 1930    4 Sheets-Sheet 2

Inventor
Hans Ernst
By Attorneys
Nathan & Bowman

April 2, 1935.  H. ERNST  1,996,467
ELECTROMAGNETIC HYDRAULIC FEED CONTROL
Filed Oct. 7, 1930  4 Sheets-Sheet 3
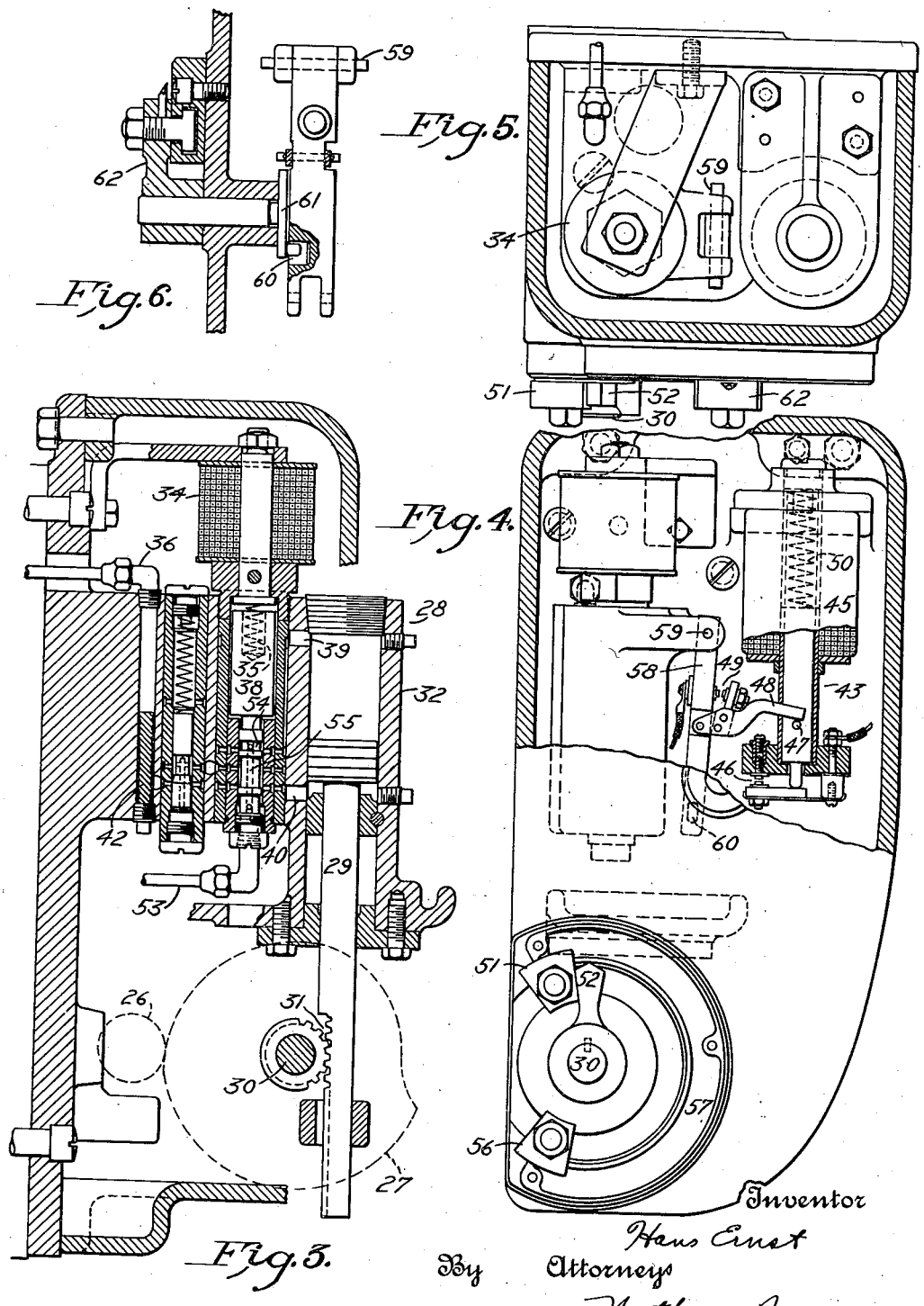
Inventor
Hans Ernst
By Attorneys
Nathan & Bowman April 2, 1935.  H. ERNST  1,996,467
ELECTROMAGNETIC HYDRAULIC FEED CONTROL
Filed Oct. 7, 1930   4 Sheets-Sheet 4

Inventor
Hans Ernst
By Attorneys
Nathan & Bowman

Patented Apr. 2, 1935

1,996,467

UNITED STATES PATENT OFFICE 1,996,467

ELECTROMAGNETIC HYDRAULIC FEED CONTROL

Hans Ernst, Cincinnati, Ohio, assignor to The Cincinnati Milling Machine Company, Cincinnati, Ohio, a corporation of Ohio Application October 7, 1930, Serial No. 486,954

11 Claims. (Cl. 90—21.5)

This invention has to do with variable feed control mechanisms and particularly those which are actuated or controlled by electrical power.

It has for a primary object to so regulate the rate of feed of cooperating machine elements that the power expended in effecting a tooling operation does not exceed a predetermined value, and as a further object to so regulate the driving mechanism of the machine that the rate of feed will be maximum at all times for a given power input.

Another object is to provide a machine tool with feed regulator which will automatically vary the feed rate within predetermined limits in accordance with variations in the value of the work resistance or working load carried by the driving means, accelerating or decelerating the rate as the conditions require, thereby to increase the efficiency of the machine and at the same time eliminate all danger of fracture to machine or workpiece.

A further objective of this invention is to provide a rate controlling mechanism for automatically adjusting the feed to a relatively slow rate prior to the engagement of the tool with the work piece so that they will be brought into contact without jarring or incurring extreme stresses upon the parts, and subsequent to engagement to regulate the feed during the continuance of the tooling operation in accordance with the work resistance. And as an additional refinement, to decrease the rate, upon completion of the cut, to a low limit suitable for tool engagement with a succeeding portion or for effecting easy reversals.

Under ordinary conditions the workpieces frequently contain "hard spots" or "flaws" and when these are encountered by the tool or tools, as the case may be, while feeding at a fixed rate, additional stresses are set up which frequently exceed the capacity of the parts and causes fractured tools or damaged workpieces. Irregular shaped work or workpieces of heterogenous formation, varying in degree of hardness, are other causes for undue strains and heretofore the machining of workpieces has necessitated the constant vigilance of a skilled operator in selecting proper feeds in order to maintain efficient operation of the machine.

Some sections of a work-piece may require heavy cuts, while other sections of the same piece only light cuts and it has been customary, heretofore, for the operator to set the machine to feed at a rate commensurate for the heavy cuts only, thereby wasting considerable time during the period of taking the lighter cuts which might have been taken at an increased speed. This invention proposes to overcome the disadvantages of prior machines by providing a means for automatically and simultaneously regulating the feed rate, within certain limits, in accordance with variations in the work resistance encountered by the tool or tools, accelerating the feed rate when the load decreases and decelerating when the load increases, thereby to increase the productive capacity of the machine without detriment to the tool or work.

Certain kinds of work, tools, or arrangement of tools with respect to the work-piece, may withstand the application of more or less power than for other set-ups and to the end that a machine tool incorporating this invention be flexible enough to accommodate a wide range of work, it is proposed to provide a rate controlling mechanism with means for adjusting the power capacity or limit of torque at which the machine may be safely operated so that whatever may be the character of the operation the feed rate will be automatically adjusted so that the power expended in effecting a tooling operation will not exceed a predetermined value at any time.

In the attainment of these results, this invention proposes a rate controlling device which reacts automatically to variations in the work resistance encountered upon the feed changing mechanism to vary the rate of feed simultaneously with changes in the character of the work. A preferred form of such a device comprises, essentially, solenoid, connected in series with a driving motor of the machine, and operative to control the circuit of an electromagnet connected with the rate control mechanism, the parts being so arranged that predetermined variations in current or resistance effects predetermined movements of the solenoid armature, thereby to control the actuation of the magnet and the rate controlling mechanism associated therewith. In this way the rate of relative movement between tool and work may be automatically regulated, in accordance with the work resistance in order to maintain a constant power consumption.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings like characters of reference denote corresponding parts throughout all the views, of which:—

Figure 2:
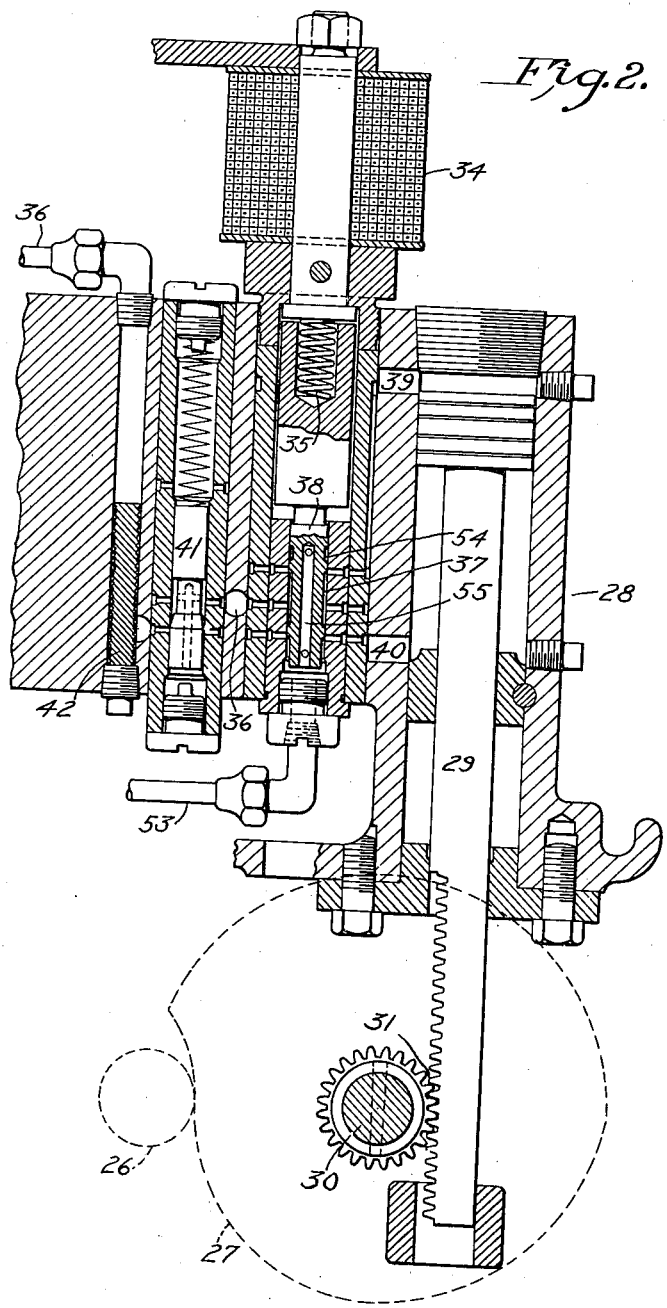
Figure 7:
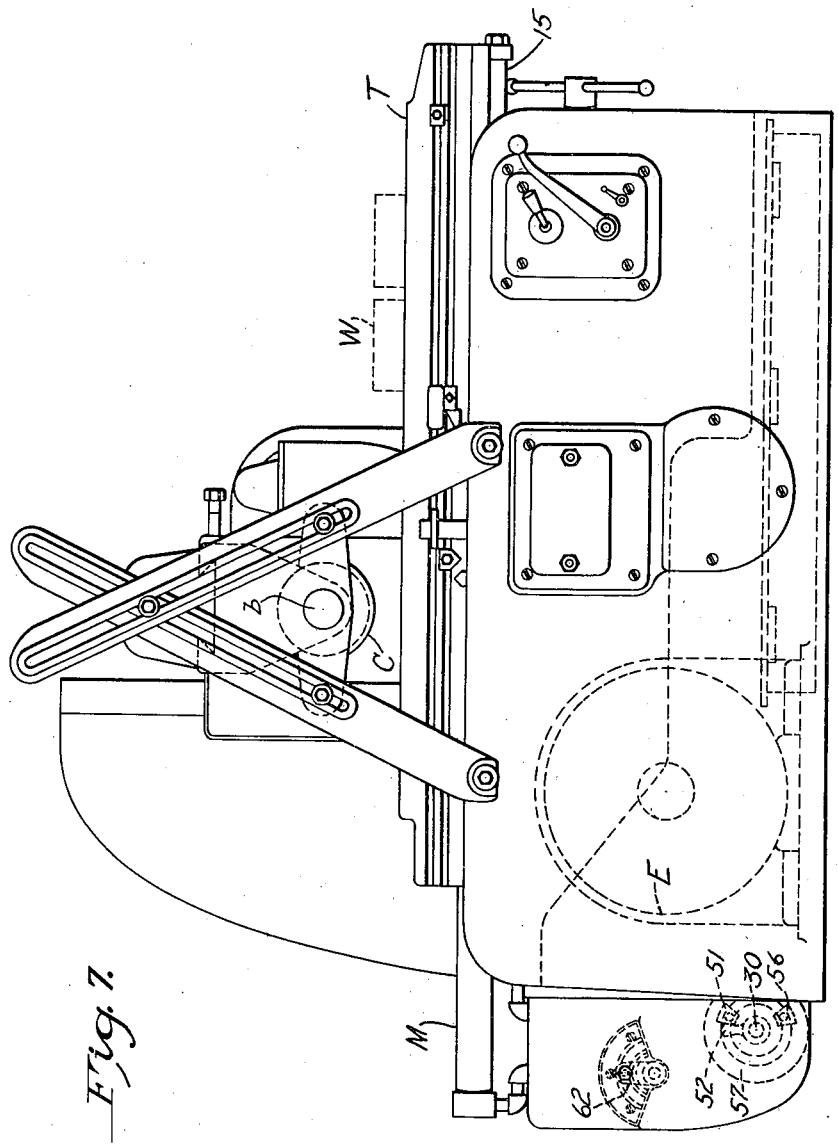

Figure 1 is a diagrammatic view of a machine tool, representing one embodiment of this invention and illustrating the parts in a position assumed when the machine is idle. Fig. 2 is an enlarged detail view of an electromagnet and the rate changing mechanism associated therewith, in a position for effecting an increase in the feed rate. Fig. 3 is a view similar to Fig. 2 but with the parts in a position decreasing the feed rate when the predetermined limit of torque has been exceeded. Fig. 4 is a detail partly in section, of the feed rate limit stops and power control means. Fig. 5 is a plan view of a portion of the apparatus illustrating the relative positions of the solenoid and electro-magnet. Fig. 6 is a fragmentary view, partly in section, of the power regulating means. Fig. 7 is an elevational view of the machine tool diagrammatically illustrated by Fig. 1.

Referring more particularly to Figs. 1 and 7, it will be noted that this invention is illustrated in connection with an hydraulically propelled milling machine of a conventional construction, but it may be readily adapted to machine tools of various other types and the reference to a milling machine herein is for the purpose of description merely and not by way of limitation.

In machines of this character it is common to impart a reciprocatory movement to the worktable T by means of an hydraulic motor M which receives fluid under pressure through and under control of suitable valves V and S. The selector valve V determines the direction of table movement as well as the rate, rapid traverse or feed, and is actuated by trip dogs mounted on the table. Valve S is a stop valve and is utilized, when the occasion requires, to isolate the fluid in the motor M from the rest of the system thereby to lock the table against further or accidental movement.

Propelling fluid may be derived from any suitable source but in this disclosure the pressure is furnished by a small volume high pressure pump B° which combines with the output of a variable delivery unit VD and then passes through line 10 to the valve V, which in the position illustrated, directs the fluid through line 11, valve S, line 12 to the right end of the cylinder 13 and urges the piston 14 and the table T toward the left. The fluid discharged from the left-end of the cylinder passes through line 16, stop valve S, line 17, selector valve V, and line 18 to the intake side of the variable delivery unit VD. It will be observed that in this particular system the rate of feed is controlled by the rate at which the fluid is permitted to escape from the hydraulic motor but whether the system is of the discharge throttled type illustrated or the supply throttled type, this invention is equally applicable.

In order to effect a rapid traverse movement to the table, a large volume pump RT draws fluid from the reservoir R and discharges it through line 19 to the valve V where it may be directed to either end of the motor M. A branch line 19ª from the RT circuit insures that the booster pump B° is continually supplied with fluid. During a feeding movement the flow from the pump RT is short circuited at the valve V (as shown in Fig. 1) back to the reservoir and the B° and VD units connected with the motor.

An electric motor E through a drive train indicated generally as a, furnishes the motive power for the hydraulic units RT, B°, and VD, the tool spindle driving train b may likewise be driven from the motor E but may have a separate and independent drive if desired.

The unit VD is a conventional standard make of variable flow unit, the rate of flow, therethrough, and thereby the speed of the motor M, is controlled by the shifting of a volume control member 25.

The foregoing briefly outlines the main features of conventional hydraulically propelled machine tool and is believed to suffice for the present purpose however, if a more detailed description thereof is desired reference may be had to the British Patent #297,104.

The present invention, however, proposes to provide an electrically controlled rate changing mechanism, responsive to changes in tooling resistance or working loads placed upon the driving motor and/or motors, for automatically effecting changes in the feed rate as the conditions warrant. A preferred form of such a control mechanism will now be explained.

Secured to the adjustable element 25 of the VD unit is a roller 26 engageable by a cam or eccentric 27. Movement of the cam, and thereby an adjustment of the VD unit, is effected in this instance, by an hydraulic motor 28, the piston rod 29 of which operates the eccentric shaft 30 as by means of a rack and pinion connection 31. The flow of fluid to and from the respective ends of the feed adjusting motor cylinder 32 is controlled by a controller valve 33, operatively associated with an electro-magnet 34 and a non-magnetic expansible spring 35.

Pressure fluid from a suitable source, preferably from the forward pressure line 10 of the feed circuit, enters the controller 33 through channels and conduits indicated generally as 36, and encircles the reduced portion 37 of the valve plunger 38 and from there, depending upon the position of the valve stem, passes through conduits 39 or 40 to the upper or lower end of the feed adjusting cylinder 32.

To the end that adjustments of the VD unit may be effected uniformly, regardless of the pressures in the system, there is provided a pressure control valve 41, inserted in the conduit 36, which reduces the pressure of the fluid entering the controller to a predetermined constant pressure somewhat lower than the lowest pressure which may ever exist in the supply line. A choking device 42 may also be inserted in this line to prevent too rapid adjustment of the members 29 and 25 and also to dampen out any pulsations or vibrations which may be present in the hydraulic circuit.

The circuit of the electro-magnet 34 is under the control of an electrical relay device 43 in the form of a power load solenoid 45 connected in series with the driving motor E. The armature 44 of the solenoid 45, when fully extended (idle load on motor), opens a line switch 46 thereby to break the electric circuit in lines P₃ and P₄ and the electro-magnet becomes de-energized. When the solenoid armature is slightly retracted, (load on motor), line switch 46 is closed and the electromagnetic circuit completed. Under these conditions the magneto motive force of the magnet shifts the controller 33 to a position which effects an increase in the feed rate, a further retraction of the solenoid armature 44, as by increasing the load, engages a pin 47 with an arm 48 which closes a second switch 49 and short circuits and thereby de-energizes the electro-magnet 34. The spring 35 then shifts the valve plunger 38 to a position permitting fluid to pass from conduit 36 through line 40 to the lower end of the feed adjusting motor 28 which effects a decrease in the feed rate.

Whether the load solenoid be connected in series with the tool driving motor or feed motor the effect of variations in motor load is the same, to wit, an increase in motor load proportionately increases the flow of current through the winding of the solenoid coil 45 and conversely. And since the magnetic field intensity of the coil increases directly with increases in current, it is possible under given conditions to establish a definite relation between the magneto-motive force of the solenoid and a load carried by the motor connected in series therewith. In the instant case, however, a coiled spring 50 is adapted to restrain the inward movement of the solenoid armature whereby a unit variation in resistance moves the armature a unit distance and by so correlating the electro-magnet switches with the positioning of the solenoid armature. It will be seen that the electro-magnet and rate control valve associated therewith may be actuated to produce changes in feed rate proportional to changes in work resistance.

The electro-magnet 34 is preferably connected to the primary power lines $P_1$ and $P_2$ of the electric motor E, and when so arranged a conventional resistor element $r$ is inserted in the shunt line $P_3$ between the line switch 46 and the coil 34 and permits sufficient current to pass for the actuation of magnet without appreciably diminishing the current value in the primary circuit.

Under normal working conditions the operator after loading, starts the machine and the table moves forward toward the cutter at a rapid traverse rate. Suitably spaced trip dogs mounted on the table, disconnect the rapid traverse circuit prior to engagement of tool and work and trips in the feed circuit, as hereinbefore explained, and the table moves forward at a slower rate. Thus far the load upon the prime mover is substantially zero, except for the relatively small amount of power required to overcome table friction, hence, the solenoid armature 44 is fully extended, the line switch 46 is open and the electro-magnet 34 de-magnetized. Spring 35 shifts the valve plunger 38 to a position connecting pressure fluid from line 36 with line 40 and the lower end of the feed adjusting cylinder 32 which moves the rate control element 25 of the variable delivery unit to a low feed position which effects an approach rate of feed for the table T. So that the rate of approach and engagement of the tool with the work may be varied to suit the requirements of the work at hand any suitable limit stops may be employed such as, for example, an adjustable abutment 51 situated within the range of movement of a lever 52 carried by the cam shaft 30. The rate adjusting motor in reducing the feed rate, imparts a counter-clockwise movement to the eccentric 27 until the pointer 52 engages the stop 51 which limits the further reduction in the feed.

The table continues its forward movement at a predetermined approach rate and upon the engagement of tool and work there is an additional load or stress placed upon the driving motor, the effect of which is the immediate increase in field intensity of the solenoid 45. The armature 44 thereof is thereby moved inwardly and permits a closing of the line switch 46 which completes the circuit of the electro-magnet 34. The magnetic force of the magnet overcomes the inertia of the valve plunger and moves it, against the action of the spring 35, to a position indicated by Fig. 2. Pressure fluid from the supply line 36 now enters line 39 and passes to the upper end of the feed adjusting motor and shifts the piston thereof downwardly which turns the eccentric disc 27 clockwise, to effect an increase in the rate of feed. Fluid exhausted from the lower end of the feed cylinder passes back through conduit 40 to the valve 33, around the lower end of the plunger 38, to the drain line 53.

It will thus be seen that the rate of feed is automatically increased after the tool engages with the work and will continue to increase until the work resistance between tool and work produces a work load upon the motor of a predetermined value. The increasing in resistance effects a further movement of the solenoid armature inwardly until the pin 47, carried by the armature, engages and rocks the lever 48 to close the switch 49 and short circuits the current to the electro-magnet 34.

The valve plunger 38, relieved of magnetic influence, is moved by the spring 35 to a position whereby fluid from the supply line 36 enters line 40 to the lower end of the feed cylinder 32, effecting a reduction in the feed rate. Fluid from the upper end of the cylinder passes back through line 39 to a reduced portion 54 of the valve plunger and thence through a central bore 55 thereof to the drain line 53.

The reduction in feed rate reduces the value of the work resistance and likewise the power required to overcome that resistance, the force of the solenoid spring 50 thereupon partially overcomes the magneto-motive force of the solenoid and moves the armature 44 outwardly and abutment 47 away from the switch lever 48. The short circuiting switch then opens, restoring the current to the electro-magnet and the valve plunger is again shifted into a position effecting an increase in the feed rate.

It may be noted here that the magnetic circuit is made and broken under a cut very rapidly, causing a fluttering movement of the valve plunger 38, and the table feeds along at a substantially constant rate of speed until a further change in work resistance however caused occurs. If harder portions of the work are encountered, or heavier cuts to be contended with, as in rough milling, the work resistance increases, the motor load increases and which, reacting through the mechanism above explained, effects a reduction in feed rate. Similarly when the work resistance decreases, the motor load decreases, and the electric relay and magnet circuits respond to effect an increase of the feed rate.

In this manner the control mechanism automatically regulates the feed rate of a machine tool in accordance with variations in tooling resistance, whereby the machine is safely and efficiently operated at a maximum rate, within predetermined limits of power input, at all times. If for any reason the work resistance should not reach a predetermined maximum and to prevent a too rapid a rate of feed for proper tooling an adjustable dog 56 may be mounted on the feed dial 57 in a position so as to limit the further increase in feed rate when the desired maximum rate has been reached.

When one tooling operation is completed the work resistance again drops to zero, the load upon the driving motor becomes substantially zero, consequently the field intensity of the solenoid coil drops and armature 44 thereof is projected by the spring 50 and opens the line switch 46. The electro-magnet is thereby disconnected and the valve plunger 38 moved to a position to effect a predetermined slow rate of movement of the table after completion of the cut. Thus, in the case of gap milling operations, a succeeding work-piece or portion of a work-piece may be engaged by the tool without shock while moving at an approach feed rate or making it possible to effect reversals or stopping of the parts when their momentum is low.

In order that a machine tool incorporating this invention may be adaptable for tooling light or fragile pieces requiring the application of more or less power or for tooling heavier or more securely mounted pieces capable of withstanding the application of greater power, this invention proposes to provide means for regulating the maximum value of the work resistance to be offered so that the resultant of the cutting forces will not exceed a pre-selected value or the capacity of the tool or work-piece.

Any suitable means for varying the effect of predetermined variations in power upon the feed rate controlling mechanism will accomplish this result, a preferred form, of which, will now be explained.

Since a unit increase in power requirement will move the armature, a unit distance, it is, therefore, possible to vary the effective distance through which it must move, thereby controlling or limiting the permissible load upon the motor, before the decelerating switch 49 is actuated by the pin 47.

For this purpose the short circuiting switch or key 49 is supported upon a swinging lever 58, one end of which is pivoted at 59 and the other end having a pin and slot connection 60 with a crank or eccentric 61. The crank arm is adapted to be adjustably positioned from the outside of the machine, convenient to the operator, as by means of a small lever 62.

The switch lever 48 projects at an angle substantially 90° from its supporting member 58 and into the path of movement of pin 47 carried by the armature of the solenoid, consequently a movement of the power control lever 62 effects a movement of the lever 48 either toward or away from its actuator 47, thereby to vary the relative distance through which the solenoid core must move before the electro-magnet is cut out of the circuit and the feed deceleration factor of the machine regulated at will. In this manner there is provided a means for regulating the maximum feeding urge and the machine may be operated at a maximum rate in accordance with the work resistance without danger of exceeding the capacity of a given tool or work-piece.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A machine tool having a work carrier and a tool carrier; hydraulically actuated means for effecting relative movement between said carriers, said means including an hydraulic motor and a variable delivery pump unit provided with an adjustable volume control element; a prime mover arranged to drive said pump unit; an auxiliary motor for adjusting the position of said volume control element; a controller for said auxiliary motor; combining an electrically controlled means, operatively associated with and responsive to variations in said prime mover, for controlling the action of said auxiliary motor comprising a solenoid operated device for controlling the movement of said auxiliary motor, an electric circuit for said solenoid, and switch means in said circuit adapted when closed to render said solenoid operative to effect movement of the auxiliary motor, and means to actuate said switch means.

2. In a machine tool having, a reciprocable work carrier; a tool carrier; hydraulically actuated means for effecting relative movement between said carriers, said means including a variable flow hydraulic unit provided with a shiftable element adapted in its various positions to vary the volume of flow through said unit and thereby to vary the rate of relative movement between said carriers; combining an electric driving motor; an auxiliary hydraulic motor operatively connected to the shiftable element of said hydraulic unit; a fluid control valve for said auxiliary motor; an electromagnet for adjusting the positioning of said control valve; and an electromagnetic relay, connected in series with said driving motor, for controlling the operation of said electromagnet, the work resistance encountered by said carriers being of a value other than zero.

3. A feed control for a milling machine having, a reciprocable work carrier; a tool carrier; combining hydraulically actuated means for effecting relative feeding movement between said carriers, said means including a variable flow hydraulic unit provided with a shiftable element adapted in its various positions to control the volume of flow through said unit and thereby to vary the rate of movement between said carriers; an electric driving motor; a feed adjusting motor operatively connected to the shiftable element of said hydraulic unit; an adjustable control member for said auxiliary motor; magnetic means for adjusting the positioning of said control member to effect a feed at a given rate; means for adjusting the positioning of said control member to effect a feed at a different rate; and electromagnetic means connected in series with said driving motor, for rendering said magnetic means effective when the work resistance encountered by one of said carriers is of a value other than zero and to interrupt the action of said magnetic means when the work resistance reaches a predetermined maximum.

4. A feed control for a machine tool combining, a reciprocable work carrier; a tool carrier; hydraulically actuated means for effecting relative movement between said carriers, said means including a variable flow hydraulic unit provided with a shiftable element adapted in its various positions to control the volume of flow through said unit and thereby to vary the rate of movement between said carriers; an electric driving motor; an auxiliary hydraulic motor operatively connected to the shiftable element of said hydraulic unit; a fluid control valve for said auxiliary motor; means for adjusting the positioning of said control valve to effect a feed at a given rate; means for adjusting the positioning of said control valve to effect a feed at a different rate; electromagnetic means connected in series with said driving motor, for rendering one of said last mentioned means effective when the work resistance encountered by one of said carriers is of a value other than zero and for rendering the other of said means effective when the work resistance reaches a predetermined maximum.

5. A machine tool comprising a work support and a tool support, power means for effecting relative reciprocatory movement between the supports at varying rates; rate controlling means for said power means, electrically controlled means for controlling the operation of the rate controlling means, thereby to vary the speed of the said power means, comprising an electrical circuit, a switch mechanism in said circuit and means responsive to a variation from a predetermined load on said power means for actuating said switch mechanism.

6. A variable speed transmission for effecting relative reciprocatory movement between supports; an electrically controlled hydraulically actuated means for varying the rate of action of said transmission thereby to vary the rate of relative reciprocatory movement between said supports, and means responsive to variations in load upon one of said transmissions for rendering the operation of said hydraulically actuated means, effective to increase or decrease the speed of movement of the said transmission in accordance with said variations.

7. A variable speed driving transmission combining; a first motor; an hydraulic motor for varying the speed of the transmission; a control valve for said hydraulic motor; electrically actuated means including control valve shifting mechanism and a load solenoid responsive to load variations on said first motor for actuating said control valve thereby to render said hydraulic motor operative to vary the speed of the transmission; means for controlling the value of the load required to render said electrically actuated means effective; and means for varying the effect of a given variation in load value upon the action of said valve shifting mechanism.

8. A milling machine having a rotatable tool spindle, a reciprocable work carrier and a variable speed power transmission for effecting relative reciprocatory movement between said spindle and carrier combining an hydraulic motor; a variable delivery pump unit for supplying fluid to said motor, said pump having a regulatable element adapted to be moved in opposite directions thereby to vary the delivery of said pump and the rate of movement of said motor; an electric motor and connections between said electric motor and said pump for driving same; an auxiliary hydraulic motor adapted to receive actuating fluid from the delivery side of said variable pump for moving the regulatable element of said pump; electrically actuated valve means controlling the action of said auxiliary motor, said means normally being maintained in a position effecting movement of said auxiliary motor in a direction whereby said regulatable element is moved to a position tending to increase the delivery of said variable pump and thus increase the rate of movement of said motor; and means automatically responsive to load variations on said electric driving motor for actuating said auxiliary motor control means to a different position thereby to effect a reduction in pump delivery and a corresponding change in the rate of reciprocatory movement between said spindle and carrier.

9. A milling machine having a rotatable tool spindle, a reciprocable work carrier and a variable speed power transmission for effecting relative reciprocatory movement between said spindle and carrier combining an hydraulic motor; a variable delivery pump unit for supplying fluid to said motor, said pump having a regulatable element adapted to be moved in opposite directions thereby to vary the delivery of said pump and the rate of movement of said motor; an electric motor and connections between said electric motor and pump for driving said pump; an auxiliary motor movable in reverse directions for moving the regulatable element of said pump; solenoid actuated means controlling the direction of movement of said auxiliary motor; and solenoid operated switch means automatically responsive to load variations on said electric driving motor for effecting actuation of said first mentioned solenoid to a position effecting a change in the delivery of said pump and a corresponding change in the rate of reciprocatory movement between said spindle and carrier.

10. A power transmission comprising an hydraulic motor adapted for movement against a variable resistance; a variable delivery pump arranged to receive the fluid discharged by said motor and thereby to control the rate of motor movement; means including said variable pump for supplying fluid to said motor; driving means for said variable pump and fluid supplying means; a power operated delivery regulating device for said variable pump; control means for said power means alternately effective to cause said power means to increase and decrease the receiving and discharging capacity of said variable delivery pump; solenoid devices for actuating said control means, one of said solenoid devices being constructed and arranged to respond automatically to load variations in said pump and fluid supplying driving means and the other of said solenoid devices being controlled by said first mentioned solenoid and operatively connected with said control means; means for varying the responsiveness of said load responsive solenoid; and electric connections between said solenoid devices adjustable to vary the effect of unit variations in load on the load solenoid upon the action of the control means operating solenoid.

11. An hydraulic transmission having a variable delivery pump unit therein, the combination of a delivery controlling element for said pump, an hydraulic actuator for actuating said element to increase or decrease the delivery of said pump; valve means adapted to receive fluid from the delivery side of said pump and to direct said fluid alternately to opposite sides of said actuator; a solenoid for effecting movement of said valve from one effective position to another; electrically operated driving means for said pump; a second solenoid connected in series with said driving means and automatically responsive to variations in load on the driving means; and relay switches actuated by the said load responsive solenoid for controlling the action of said valve actuating solenoid, one of said switches when closed by the load solenoid, completing the circuit to the valve shifting solenoid and another of said switches when closed by the load solenoid short circuiting the valve shifting solenoid; and means adjustably controlling the unit value of the variation in load required to close said first mentioned switch and render said valve shifting solenoid effective.

HANS ERNST.